May 8, 1962  R. J. LEICHTER  3,033,992
COMMUTATING TRANSFORMER
Filed June 15, 1959
2 Sheets-Sheet 1

INVENTOR:
ROBERT J. LEICHTER,
BY Donald C. Keaveney
HIS ATTORNEY.

May 8, 1962 R. J. LEICHTER 3,033,992
COMMUTATING TRANSFORMER
Filed June 15, 1959 2 Sheets-Sheet 2
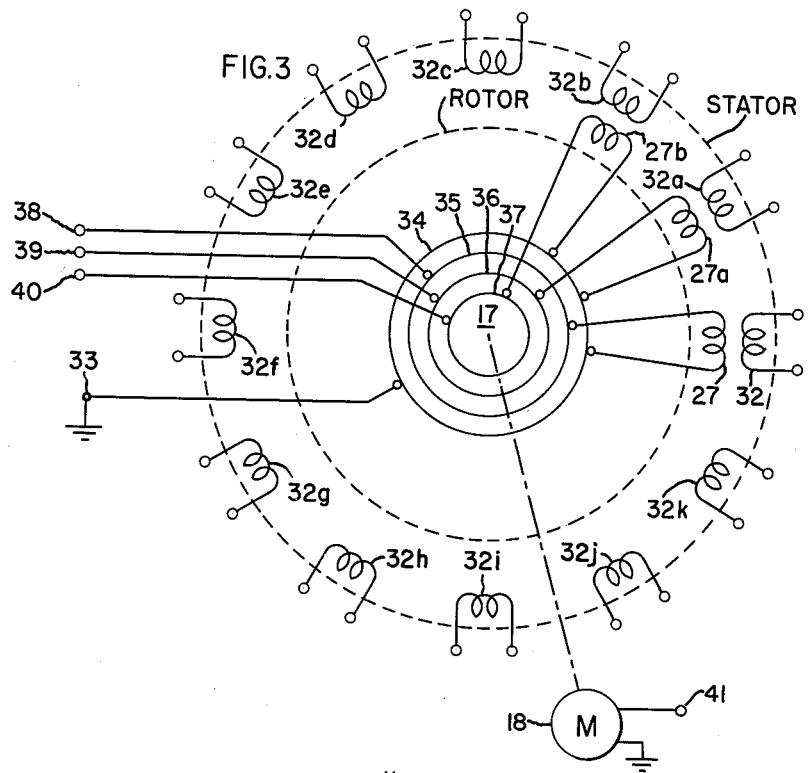
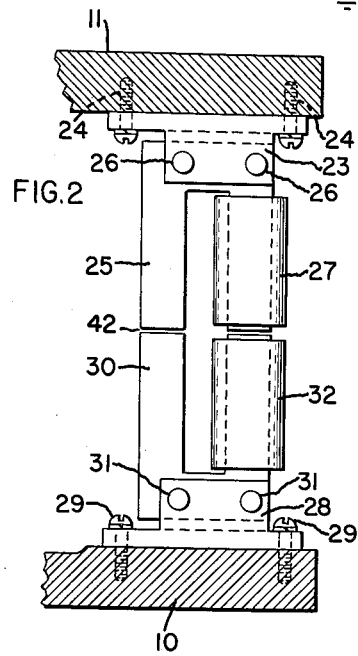
INVENTOR:
ROBERT J. LEICHTER,
BY Donald C. Keaveney
HIS ATTORNEY.

`United States Patent Office`

3,033,992
Patented May 8, 1962

3,033,992
COMMUTATING TRANSFORMER
Robert J. Leichter, Liverpool, N.Y., assignor to General Electric Company, a corporation of New York
Filed June 15, 1959, Ser. No. 820,326
9 Claims. (Cl. 307—43)

This invention relates to a commutating transformer of electrical energy or signals. More particularly the invention relates to a commutating transformer adapted to couple relatively low frequency and relatively high power-level signals or energy from one group of electrical circuits to one of a plurality of subgroups of circuits sequentially selectable from a second and larger group of circuits. In addition to its function as a commutating coupler, the transformer also acts as an impedance matching device between the two groups of circuits.

This application is a continuation-in-part of and claims subject matter disclosed in applicant's prior co-pending application Serial No. 659,649 filed May 16, 1957.

Such a commutating transformer has useful application in coupling energy in a selective manner between a plurality of electrical circuits. More generally, the commutating transformer may be advantageously used in any system application where it is desired to controllably couple one group of one or more electrical circuits to any one of a plurality of subgroups of circuits selectable from a second and larger group of circuits. In another specific application, for example, the transformer may be used to control animated illuminated advertising displays. If a group of lamps are, for example, arranged in a circular pattern, or in any other desired pattern or figure, the transformer may be used to light a selected subgroup of the lamps and to cause the illuminated subgroup to rotate around the circular pattern, to oscillate, or to perform any other desired motion to attract the attention of the public.

The applications referenced above are suggested here merely by way of example since, from the description given below, many other applications of the commutating transformer will be immediately obvious to those skilled in the electrical and electronic arts.

It is therefore an object of this invention to provide a commutating transformer of electrical energy adapted to couple a first group of electrical circuits to any one of a plurality of subgroups of circuits selectable from a larger second group.

It is a more specific object of this invention to provide a unitary assembly comprising a driven rotor having a plurality of input coils fed through slip-rings and mounted thereon in electrically coupled relationship to a subgroup of output coils selectable from a larger group of output coils mounted on a fixed stator.

Briefly, in accordance with one embodiment of the invention, a circular stator plate has a plurality of output coils mounted in uniformly spaced relation to each other about its entire circumference. A circular rotor plate of substantially the same diameter as the stator plate is rotatably mounted in concentric parallel spaced relation to the stator plate and is provided with any convenient drive means. A group of input coils is mounted along an arc consisting of a fraction of the circumference or perimeter of the rotor. The input coils have generally the same size and angular spacing as the output coils so that they are always in spaced registration with and hence inductively coupled to one subgroup of the output coils for any position of the rotor. That is to say, in any position of the rotor its input coils are in electrically coupled relationship with a different subgroup of output coils. The particular subgroup of output coils to be actuated may therefore be selected by varying the position of the rotor.

While the novel and distinctive features of the invention are particularly pointed out in the appended claims, a more expository treatment of the invention, in principle and detail, together with additional objects and advantages thereof, is afforded by the following description and accompanying drawing of a representative embodiment in which:

FIG. 2 is a side elevational view of the mounting arrangement of one input and one output coil.

FIG. 3 is a simplified schematic wiring diagram of the commutating transformer of FIG. 1.

Figure 1:
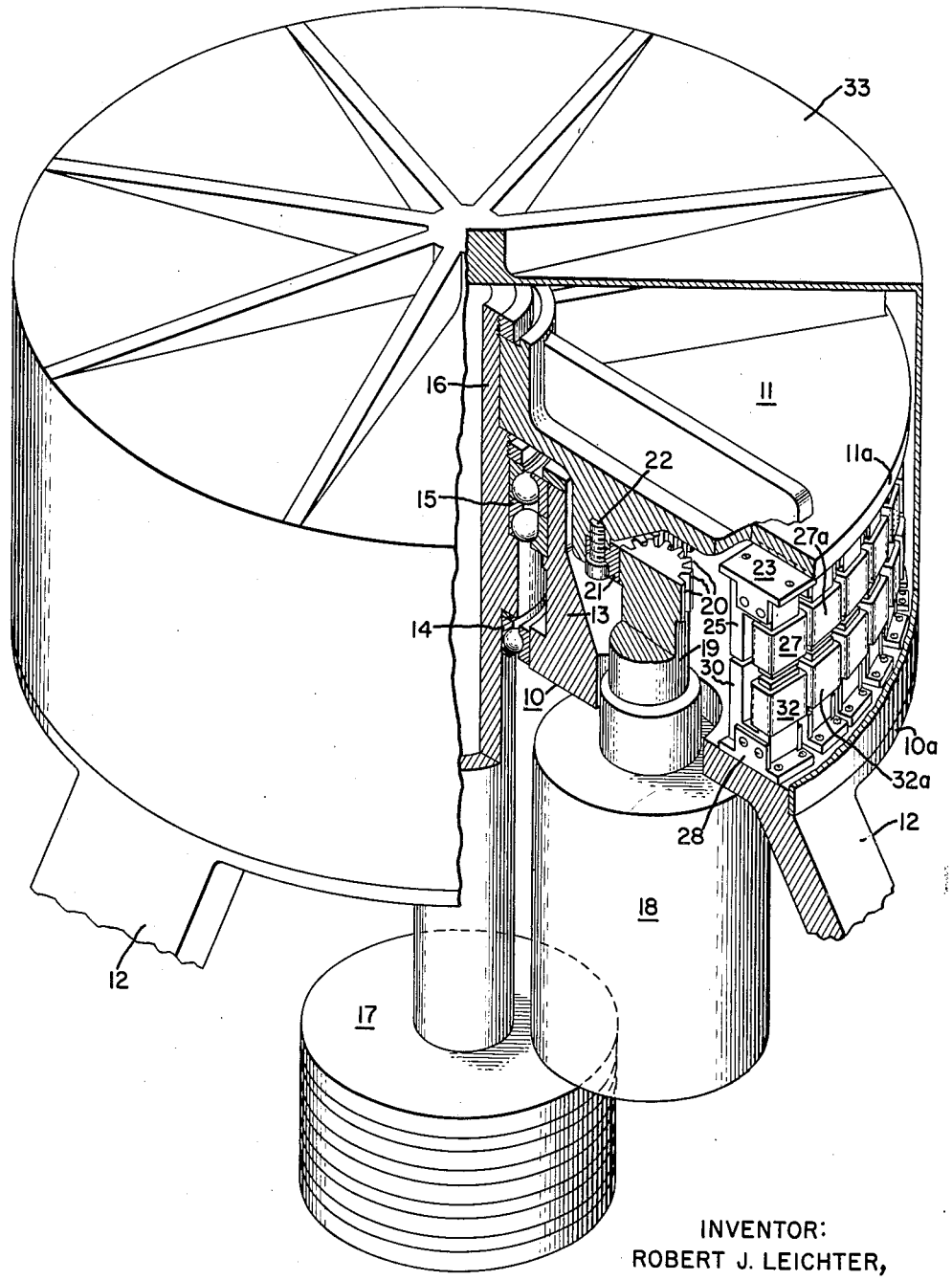
FIG. 1 is a perspective view, partly broken away, showing the unitary commutating transformer assembly.

Turning now to the drawings, and in particular to FIG. 1, there is shown a stator member 10 and rotor member 11. Both the stator 10 and the rotor 11 include, as their major structural elements, generally plate-shaped members having outer edges or perimeters, 10a and 11a respectively, which are circular in shape and have substantially equal diameters. The circular base plate member of stator 10 has attached thereto any convenient supporting means such as a plurality of legs 12. A flange 13 extends upwardly from the base plate of stator 10 so as to surround an aperture or circular opening at the center of the base plate. The material forming the edge of this aperture is grooved so as to also form the stationary portion of a first ball bearing race 14. The top of the flange member 13 is also circularly shaped and is similarly grooved to form the stationary portion of a second ball bearing race 15. Rotor member 11 is integrally attached to a hollow shaft 16 which protrudes downwardly through the aperture or circular opening in the center of the base plate of stator 10. Shaft 16 has grooves on its outer surface which mate with and complete the ball bearing races 14 and 15 in such fashion as to thereby rotatably support shaft 16 and rotor 11 on flange member 13 of stator 10.

Attached to and depending from the lower end of shaft 16 is a conventional slip-ring assembly 17. The electrical connections for assembly 17 are shown in FIG. 3 and will be discussed in detail below. A motor 18 is attached to and depends from the base plate of stator 10 as shown in FIG. 1. Motor 18 is preferably of the direct current type and has a shaft 19 which projects upwardly through a second aperture in the base plate of stator 10. The upper end of shaft 19 is provided with a plurality of driving gear teeth 20 which mesh with the teeth of a ring gear 21 to drive rotor 11. Ring gear 21 is attached to rotor 11 by any convenient means such as screws 22. A protective cover 33 is desirably placed over rotor 11 and may be supported upon the outer edge of stator 10 as shown in FIG. 1.

As best seen in FIGS. 1 and 2, a plurality of generally C-shaped input coil supporting members 23 are attached in uniformly spaced and in depending relation to a portion of the under surface of rotor member 11 near or at the outer edge or perimeter thereof. Each supporting member 23 is attached to rotor 11 by any convenient means such as screws 24. The U-shaped core 25 upon which input coil 27 is wound is in turn attached to support member 23 by any convenient means such as screws 26.

A plurality of generally C-shaped output coil supporting members 28 are similarly attached in uniformly spaced and in upstanding relation to a portion of the upper surface of stator member 10 near the outer edge or perimeter thereof. Each supporting member 28 is attached to stator member 10 by any convenient means such as screws 29. The U-shaped core 30 upon which output coil 32 is wound is in turn attached to support member 28 by any convenient means such as screws 31.

It will be noted from FIGS. 1 and 2 that input coil 27 and output coil 32 and their respective supporting assemblies are generally of the same shape and dimension and are so disposed with respect to each other that, in the position of the rotor shown, input coil 27 is above and in direct vertical alignment or registration with output coil 32. That is to say, the input coil 27 and output coil 32 are positioned in inductively coupled relationship. Furthermore in order to minimize stray coupling between adjacent pairs of input and output coils the gap 42 between the cores of input and output coils should be made as small as possible consistantly with dependable mechanical clearance of the vertically aligned coils during rotation. The smaller the gap between the cores, the more the flux will be confined to the area immediately below and above the input and output cores respectively. That is to say, for the position of the rotor shown in FIG. 3, a small gap will cause the signal from coil 27a to couple substantially entirely to coil 32a with only negligible stray coupling to coils 32 or 32b.

Also, for the position of the rotor shown, the coupling between coils 27 and 32, as well as between 27a and 32a, 27b and 32b, will be at a maximum. Of course, as will be explained in detail below, different subgroups of pairs of input and output coils are placed in inductively coupled relationship of varying degree for the different positions assumed by the rotor as it is driven by motor 18.

Turning now to a detailed consideration of FIG. 3, there is shown a simplified wiring diagram of the commutating transformer shown in FIGS. 1 and 2. For convenience and simplicity of illustration, there is shown in FIG. 3 only three input coils 27, 27a and 27b and twelve output coils 32, 32a—b—c—d—e—f—g—h—i—j— and 32k, respectively. It will of course be understood, however, that any reasonable integral number M of output coils and any reasonable integral number N of input coils may in general be used in accordance with the needs of a particular application. In accordance with the present invention the number N of input coils should, however, be less than the number M of output coils but need not bear any other particular relation thereto.

Since, as noted above, the output coils are uniformly positioned along the edge of the stator 10, the distance between the centers of adjacent coils will be an arc of the perimeter of the stator subtending a central angle of $(360°)/M$. In order to achieve the desired registration of input and output coils indicated above in connection with FIGS. 1 and 2, each input coil mounted on the edge or perimeter of rotor 11 should likewise be separated from the center of the adjacent input coil by an arc length which also subtends a central angle equal to $(360°)/M$. The total arc length of the perimeter of the rotor occupied by the input coils will thus be $(360° \ N)/M$. It is thus apparent that if one desires to actuate M different sequentially arranged sub-groups of output circuits, where each subgroup consists of N circuits, one should provide M separate output coils uniformly spaced around the perimeter of the stator, and N separate similarly dimensioned input coils uniformly spaced about a fraction, N/Mths, of the perimeter of the rotor. The length of the space between adjacent input coils and between adjacent output coils will determine the smoothness of the commutating action of the transformer. In certain applications where the maximum possible smoothless of commutation is desired, the spacing between adjacent coils should be as small as is possible in view of mechanical mounting and electrical insulating requirements. If, for example, the spacing between coils along the edge of the rotor or stator is made 25% of the length of a coil along these edges, then each input coil will always be at least partially coupled to one or two output coils. Although the simplified diagram of FIG. 3 is not drawn to the scale suggested, it will be noted that when the rotor is in the position shown in FIG. 3, coil 27 has maximum coupling to coil 32 only. If the rotor turns so that coil 27 is positioned midway between coils 32 and 32a, then (with the space between these two coils equal to 25% of their length) 37.5% of the length of coil 27 will be directly aligned with coil 32 and another 37.5% of its length will be directly aligned with coil 32a. This is the position of minimum coupling to two coils. The smaller the difference between the minimum and maximum values of coupling, the smoother the commutating action will be, particularly where gap 42 between the cores has been made small as suggested above to eliminate any stray coupling. If the space between any two contiguous coils exceeds the length of a coil one will, of course, not have continuous commutation but rather a switching arrangement with a distinct time interval between the actuation of the various output circuits.

Of course, the functions of the stator and rotor as to input and output may be interchanged if desired since the commutating action depends solely on the relative motion of the two members. Such an interchange would correspond to the change from transmission to reception in a data processing system application. For the same reason the larger number of coils M could, if desired, be placed around the entire perimeter of the rotor rather than the stator. If this is done, of course, the smaller number of coils N should be placed along a portion of the perimeter of the stator.

Considering FIG. 3 in greater detail, it will be noted that a ground terminal 33 is connected to ring 34 of the slip-ring assembly 17. Signal input terminals 38, 39, and 40 are connected respectively to rings 35, 36 and 37 of slip-ring assembly 17. Each of the input coils 27, 27a and 27b has one end connected to ring 34 and therefore to ground. Input coils 27, 27a and 27b have their other ends connected respectively to rings 35, 36 and 37 and thereby to signal input terminals 38, 39, and 40 respectively. As indicated by the dash line, the input coils are mounted on the rotor. The rotor and the attached slip-ring assembly are driven in turn by rotor 18 as indicated by the dot-dash line. Motor 18 may preferably be of the D.-C. type having power supplied to it between ground and an input terminal 41 so that the speed of the motor may be controlled by the voltage of the applied power to thereby control the rotor speed. Physically, the connecting wires from rings 34, 35, 36 and 37 are brought up through hollow shaft 16 and may be extended in any convenient manner across the surface of rotor 11 to the input coils.

As noted above, the output coils 32 through 32k are mounted on the stator as schematically indicated by the dished circular line. Each of these output coils has a pair of output terminals which are conveniently brought out through the bottom of the stator and which may be connected to one or more load or work circuits such as the individual lamps in the illuminated display application noted above, etc.

Considering now the operation of the commutating transformer, it will be seen that as the rotor 11 is turned in a counterclockwise direction by motor 18 the stator coils 32, 32a and etc. remain fixed in position. Consequently, rotor coil 27 is gradually decoupled from stator coil 32 at a rate depending upon the speed at which motor 18 drives rotor 11. Simultaneously coil 27a is decoupled from coil 32a and coil 27b is decoupled from coil 32b. After an interval of time equal to $1/M(r.p.s.)$, where r.p.s. is the speed of the motor in revolutions per second, and M, as noted above, is the number of output coils, coil 27 will reach maximum coupling with coil 32a, coil 27a will reach maximum coupling with coil 32b, and coil 27b will reach maximum coupling with coil 32c. That is to say, in the position of the rotor shown in FIG. 3, wherein the number of input coils $N=3$ and the number of output coils $M=12$, the subgroup of three output circuits 32, 32a and 32b is actuated first. Thereafter, the next subgroup of three output circuits 32a, 32b and 32c is actuated. This actuation of different subgroups each consisting of N output circuits sequentially selected from a group of M output circuits may be carried on either uniformly at a rate determined by the speed of motor M or in a variable fashion by varying the speed of motor M. In most applications, and in particular in the above noted system application, the speed of the motor M will be uniform and will have a magnitude which is small by comparison with the frequency of the signals applied to terminals 38, 39, and 40 so that considerably more than one cycle of the signal will be coupled out through each of the actuated subgroups. In some signal modifying applications however it may be desirable to have the motor M operate at a speed equal to or greater than the frequency of the signals applied to terminals 38, 39, and 40.

Again depending upon the system application, the signals applied to terminals 38, 39, and 40 may either be identical or may differ as to their amplitude, phase, and/or frequency. Let us assume, for example, that it is desirable to introduce a phase difference or time delay between the applied input signals. If the signals applied to terminals 38 and 40 are delayed by the desired amount with respect to the signal applied to terminal 39, the three output circuits will respond. In such a system the use of the commutating transformer permits switching at a high power level and thus saves auxiliary equipment since separate power amplifiers need be provided only for each of the smaller number N of input channels rather than for each of the larger number M of output channels as would be required if a low power level switching system were used. Furthermore the direct connection of the output coils to the output circuits permits one to select a turns ratio between input and output coils of the transformer which will match the impedance of the load or output circuits to the impedance of the input signal driving circuits for maximum efficiency.

On the other hand, in the above noted illuminated display applications it may be desirable either to actuate terminals 38, 39 and 40 by a constant amplitude equal phase and equal frequency signal or to apply an interrupted signal to terminal 39 so that the center light of the rotating illuminated pattern will blink on and off as the pattern rotates. It is thus apparent that the nature of the relation between the amplitude, frequency, and phase of the applied input signals will be determined by the requirements of the particular system application in which the commutating transformer is used.

It should also be noted that in certain applications, involving a plurality of output or load circuits, it may be desirable to use a plurality of commutating transformers of the type described herein and to control the phase relations between their rotors. In such an arrangement one commutating transformer may be needed to control each output circuit. In practice, of course, the separate output circuits may be mechanically constructed as a unitary assembly, but electrically one may be selected to control the relative mechanical phase relations between the rotors of the various transformers. In this particular type of application such mechanical phase control of the rotors (and hence of the electrical actuation of the different transducers) is most readily achieved by driving each of the rotors with a synchronous motor, rather than a D.-C. motor, and controlling the phase relations between the electrical power inputs applied to the terminals 41 of the various synchronous motors. Thus, whether the terminal 41 be used for speed control or for this type of phase control, it will be noted that the nature of the electrical output signals from the output coils will be determined not only by the nature of the signals applied to the input terminals 38, 39, and 40, but also by the nature of the control signal applied to motor terminal 41.

In still other types of applications where oscillation rather than rotation of output circuit actuation is desired, it may be desirable to modify the construction of the transformer so that the input and output coils are mounted along straight edges reciprocating with respect to each other rather than along arcs rotating with respect to each other. Such a straight edge mounting is equivalent to mounting along an arc of infinite radius. In either arrangement, however, it is desirable that the effective radius of the rotor be equal to the effective radius of the stator. When these radii are equal, input and output coils of the same linear dimension will subtend equal angles of arc and hence may be placed in direct vertical alignment for the most efficient inductive coupling with a minimum of leakage losses or stray coupling.

While the principles of the invention have now been made clear in illustrative embodiments, there will be immediately obvious to those skilled in the art many modifications in structure, arrangement, proportions, elements and components used in the practice of the invention, and otherwise, which are particularly adapted for specific environments and operating requirements, without departing from those principles. The appended claims are, therefore, intended to cover and embrace any such modifications, within the limits only of the true spirit and scope of the invention.

What I claim and desire to obtain by Letters Patent of the United States is:

1. Commutating electrical coupling means adapted to sequentially apply a group of N electrical input signals to a plurality of subgroups of output circuits, each subgroup consisting of N electrical circuits selectable from a larger group of M such circuits where M and N are integral numbers and M is larger than N, comprising; a stator member, means to rigidly support said stator member; a group of M output coils mounted in uniformly spaced relationship to each other along an edge of said stator member; means to connect each of said output coils to one of said output circuits; a rotor member movably mounted in parallel spaced relationship to said stator member; a group of N input coils mounted in uniformly spaced relationship to each other along a portion of an edge of said rotor, said portion of said rotor edge having a length equal to $N/M$ times the total length of said stator; said group of N input coils being in inductively coupled electrical relationship with one subgroup of said M output coils for any position of said rotor; means to apply one of said input signals to each of said input coils; means to derive an output signal from each of said output coils; and means to move said rotor with respect to said stator.

2. A commutating electrical transformer adapted to sequentially apply a group of N electrical input signals to M subgroups of output circuits each subgroup consisting of N output circuits sequentially selectable from a larger group of M such output circuits where M and N are integral numbers and M is larger than N comprising; a stator member having a circularly shaped periphery, means to rigidly support said stator member; a group of M output coils mounted in uniformly spaced relationship to each other along the entire length of said periphery of said stator member; means to connect each of said output coils to one of said output circuits; a rotor member having a circularly shaped periphery, the diameter of said rotor member being substantially equal to the diameter of said stator member, means to rotatably mount said rotor member in concentric spaced parallel relationship to said stator member; a group of N input coils mounted in uniformly spaced relationship to each other along a portion of said periphery having a length equal to $N/M$ times the total length of said rotor periphery; said group of N input coils being in inductively coupled electrical relationship with one subgroup of said M output coils for any position of said rotor; means to apply one of said input signals to each of said input coils; and electrical motor means to rotatably drive said rotor with respect to said stator.

3. Apparatus as in claim 2 wherein said motor means is a direct current motor the speed of which may be controlled by controlling the magnitude of a voltage applied to an input terminal thereof.

4. Apparatus as in claim 2 wherein said motor means is a synchronous motor the operation of which may be controlled by controlling the frequency and phase of a current applied to an input terminal thereof.

5. A commutating electrical transformer adapted to sequentially apply a group of N electrical input signals to M subgroups of output circuits each subgroup consisting of N output circuits sequentially selectable from a larger group of M such output circuits where M and N are integral numbers and M is larger than N, comprising; a stator member having a circularly shaped generally plane plate portion; means to rigidly support said stator member; a hollow cylindrical flange member extending upwardly from said plane plate member and surrounding a central aperture therein; a group of M output coils mounted in uniformly spaced relationship to each other along the entire length of the periphery of said stator member; a rotor member having a circularly shaped generally plane plate portion, the diameter of said rotor plate member being substantially equal to the diameter of said stator plate member, said rotor plate being integrally attached to a hollow shaft, said shaft protruding downwardly through said flange member and said aperture in said stator plate member and further being rotatably mounted within said flange surrounding said aperture so as to rotatably mount said rotor member in concentric spaced parallel relationship to said stator member; a slip-ring assembly attached to the lower end of said shaft; a group of N input coils mounted in uniformly spaced relationship to each other along a portion of the periphery of said rotor, said portion of said rotor periphery having a length equal to $N/M$ times the total length of said rotor periphery; said group of N input coils being in inductively coupled electrical relationship with one subgroup of said M output coils for any position of said rotor; means to connect each of said input coils to at least one ring of said slip-ring assembly through said hollow shaft; means to connect each said output coils to at least one output circuit; and electrical motor means to drive said rotor.

6. Apparatus as in claim 5 wherein said motor means is integrally attached to the lower side of said stator member, and wherein a shaft from said motor protrudes upwardly through said stator member and has a driving gear formed on the upper end thereof, said driving gear being engaged with a ring gear attached to said rotor.

7. A commutating electrical transformer adapted to sequentially apply a group of N electrical input signals to M subgroups of output circuits each subgroup consisting of N output circuits sequentially selectable from a larger group of M such output circuits where M and N are integral numbers and M is larger than N, comprising; a stator member having a circularly-shaped periphery, means to rigidly support said stator member; a group of M output coils upstandingly mounted from said stator and in uniformly spaced relationship to each other along the entire length of said periphery of said stator member; a rotor member having a circularly-shaped periphery, the diameter of said rotor member being substantially equal to the diameter of said stator member, means to rotatably mount said rotor member above and in concentric spaced parallel relationship to said stator member; a group of N input coils dependingly mounted from said rotor and in uniformly spaced relationship to each other along a portion of said periphery of said rotor, said portion of said rotor periphery having a length equal to $N/M$ times the total length of said rotor periphery; said group of N input coils being in inductively coupled electrical relationship with one subgroup of said M output coils for any position of said rotor; means to apply an electrical input signal to each of said rotor mounted input coils; means to derive an electrical output from each of said stator mounted output coils; and electrical motor means to rotate said rotor at a controllable speed.

8. Apparatus as in claim 7 wherein each of said input and said output coils is wound upon a U-shaped core member, each of said coils and each of said cores having substantially the same linear dimensions, the air gap between the cores of said upstandingly mounted output coils and said dependingly mounted input coils being of negligible width by comparison to said dimensions of said coils.

9. Apparatus as in claim 7 wherein each of said input and of said output coils have substantially the same linear dimensions, and wherein said uniformly spaced relationship of said mounting of said input and of said output coils is such that the peripheral length between any two contiguous output coils or any two contiguous input coils is less than the peripheral length of any one of said coils.

References Cited in the file of this patent

UNITED STATES PATENTS

| | | |
|---|---|---|
| 2,752,584 | Burke | June 26, 1956 |
| 2,786,182 | Herbert | Mar. 19, 1957 |
| 2,894,231 | Krasno | July 7, 1959 |